United States Patent [19]

Le Carvennec et al.

[11] Patent Number: 4,868,804
[45] Date of Patent: Sep. 19, 1989

[54] OPTICAL MEMORY SYSTEM WHICH USES A DIFFERENT ILLUMINATION MODE WHEN SCANNING RESERVED AREAS

[75] Inventors: François Le Carvennec, Cernay La Ville; Daniel Lecomte, Paris; Dominique Leterme, Gif Sur Yvette; René Roméas, Palaiseau, all of France

[73] Assignee: Alcatel Thomson Gigadisc, Paris, France

[21] Appl. No.: 879,436

[22] Filed: Jun. 27, 1986

[30] Foreign Application Priority Data

Jun. 28, 1985 [FR] France .................. 85 09856

[51] Int. Cl.⁴ .............................. G11B 7/00
[52] U.S. Cl. ...................... 369/45; 369/110; 369/111; 369/100; 369/54
[58] Field of Search ............ 369/44, 45, 46, 110, 369/111, 112, 100, 54, 116; 350/379; 360/114; 250/201 DF

[56] References Cited

U.S. PATENT DOCUMENTS

| | | | |
|---|---|---|---|
| 3,753,608 | 8/1973 | Bernal G. ........................ | 350/379 |
| 3,983,317 | 9/1976 | Glorioso ........................ | 369/112 X |
| 4,094,010 | 6/1978 | Pepperl et al. ................. | 360/77 |
| 4,406,520 | 9/1983 | Sato .............................. | 369/110 X |
| 4,447,722 | 5/1984 | Saimi ............................ | 369/45 X |
| 4,509,156 | 4/1985 | Ohara et al. ................... | 369/54 |
| 4,542,492 | 9/1985 | Leterme et al. ................ | 369/110 X |
| 4,564,931 | 1/1986 | O'Hara et al. ................. | 369/110 |
| 4,566,088 | 1/1986 | Yoshida et al. ................ | 369/111 X |
| 4,660,189 | 4/1987 | Taskamura et al. ............ | 369/54 X |
| 4,695,994 | 9/1987 | Steenbergen et al. .......... | 369/100 X |

FOREIGN PATENT DOCUMENTS 60-239929 11/1985 Japan .................................... 369/116

*Primary Examiner*—Aristotelis M. Psitos
*Attorney, Agent, or Firm*—Cushman, Darby & Cushman

[57] ABSTRACT

The present invention relates to optical memories for storing data on the surface of an information-supporting medium including pre-formatted patterns. Such a memory may constitute a random access mass memory, and it may be read/write memory or it may be a write-once memory. The operations of writing to the memory and reading from the memory are based on the optical interaction which occurs at the point of impact of an incident optical beam which causes local changes in optical characteristics which are representative of the data when data is being written, and which produce optical modulation detectable by photoelectric means during data reading. The invention provides an optical memory in which the illumination mode common to reading data and to detecting pre-formatting patterns is modified in order to allow for operation in a standby mode or in order to delete areas reserved for storing data, for example.

13 Claims, 4 Drawing Sheets

OPTICAL MEMORY SYSTEM WHICH USES A DIFFERENT ILLUMINATION MODE WHEN SCANNING RESERVED AREAS

The present invention relates to optical memories for storing data on reserved areas of the surface of a data-supporting medium.

BACKGROUND OF THE INVENTION

Writing and reading data requires the data medium to be illuminated with a light spot produced by accurately focussing incident radiation. Pre-formatting patterns are disposed on the reference surface of the data medium in order to distinguish adjacent track elements. The formatting patterns are situated outside the areas which are reserved for the data.

Each track element is thus split up into alternating sites which are scanned in succession by the light spot.

When the light spot is being used for reading the pre-formatting patterns and the contents of the data blocks, the data medium must be illuminated in such a manner as to avoid changing its optical characteristics, while still being sufficiently brightly illuminated to ensure that the detected signals are accurate. In contrast, when data is being recorded, the energy received by the data medium is increased in order to effect proper recording thereof. In this type of operation at two levels of brightness, the high brightness level is strictly limited to the data areas since it is important to avoid damaging the pre-recorded formatting patterns. To this end, the read/write device is provided with a brightness control circuit for controlling the power of the incident radiation and for taking account of the alternation between the special formatting areas having the pre-recorded formatting patterns thereon and the larger data areas in which data may be written.

The use of an optical memory necessarily includes both writing and reading stages, however in most types of use, both of these stages occupy only a very small proportion of the total operating time. Thus, when using an optical disk memory, the disk is kept rotating and the focusing, synchronizing, and tracking functions are all kept operating even when no read or write operation is to be performed. This standby state ensures that the memory responds rapidly when suitable instructions are received The density of energy on the illuminated portion of the disk is high while scanning the pre-formatted patterns, since the spot must read these patterns with great accuracy. The same is true when reading or writing data, however it will readily be understood that in the standby state, or when performing a function other than writing or reading, it is possible to modify the density of illumination which is received by the medium.

Optical memories, and in particular "reversible", i.e, erasable and re-writable memories are subject to aging like any other medium, and it is well know that aging is accelerated by all kinds of stresses. It is also well known that in order to erase a disturbance of given size, selective means for performing erasure must act over an area which is at least slightly larger than the area in which writing has taken place, and that such erasure means must not reproduce the same conditions that occur during writing.

Given the above conditions, and ignoring the writing of data, it may be considered to be a drawback to maintain the illumination conditions of a data medium constant during the remainder of its operating time.

Preferred embodiments of the present invention mitigate this drawback by providing a common illumination mode of the data medium for reading transcribed data or for reading the pre-formatted patterns which lie between the areas reserved for storing data, and proposes modifying the illumination mode while scanning these areas during a stage which is neither a write stage nor a read stage.

SUMMARY OF THE INVENTION

The present invention provides an optical memory for storing data in reserved areas on the surface of an information-supporting medium, said areas being disposed in the form of track elements which alternate with interposed areas composed of pre-formatted patterns serving to define said track elements, said memory comprising means for selectively optically scanning any one of said track elements and producing a common illumination mode suitable both for reading transcribed data and for reading said pre-formatted patterns, means being provided for modifying said illumination mode during a phase for scanning said reserved areas, the modified illumination mode existing independently of a phase for writing obtained by means of another modified illumination mode, the optical memory including the improvement of sampling means for ensuring that focusing means and track-following means are effected solely by those portions of the photo-detected signal which correspond to the contents of the interposed areas.

BRIEF DESCRIPTION OF THE DRAWINGS

An embodiment of the invention is described by way of example with reference to the accompanying drawings, in which.

MORE DETAILED DESCRIPTION

Figure 1:
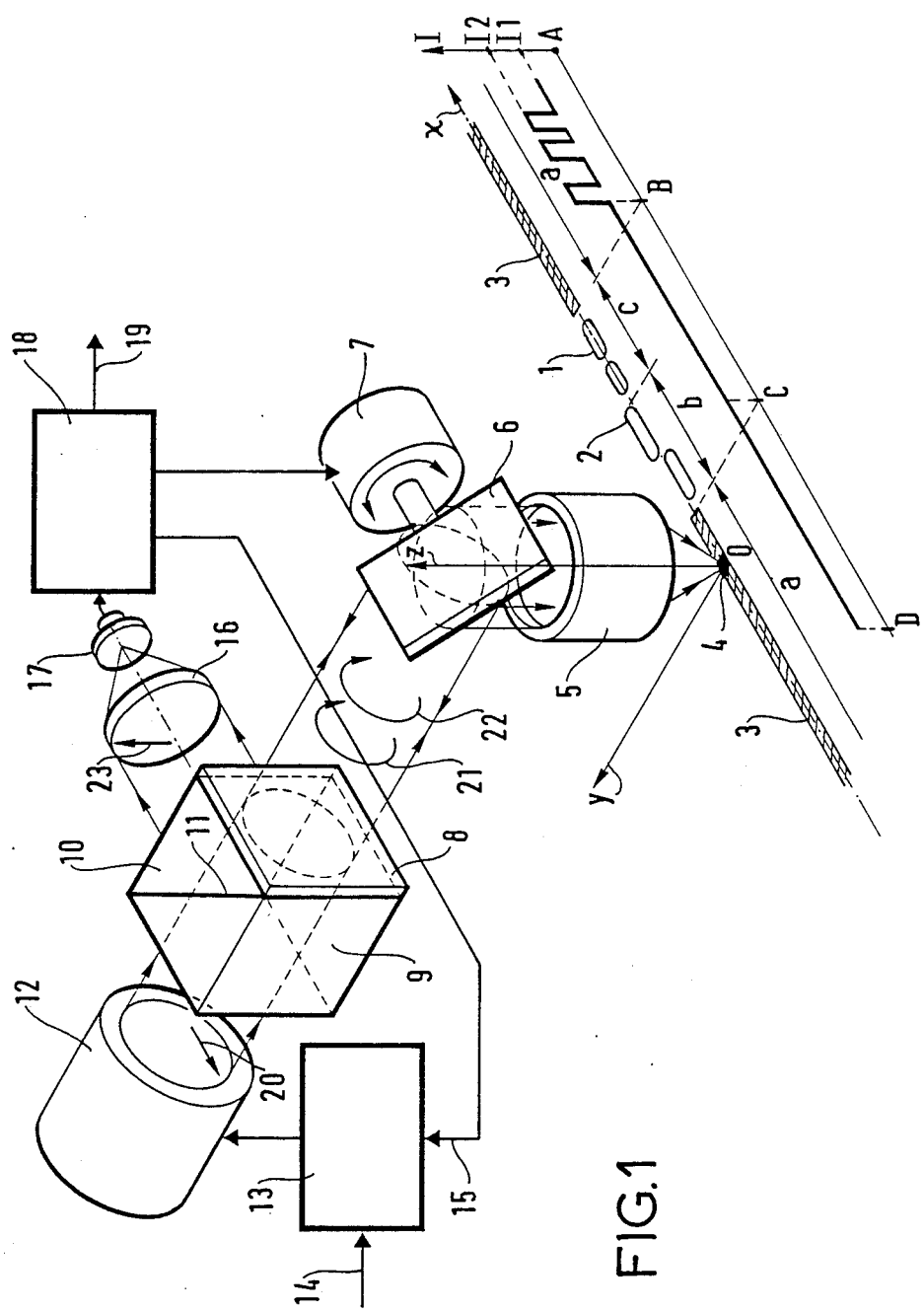
FIG. 1 is an isometric view of an optical memory of conventional type.

FIG. 1 shows a portion of the surface of a data medium on which a length of track element has been drawn, comprising areas 3 for recording data in blocks of length a. Two areas 3 are separated from each other by an intermediate area which comprises, for example, pre-formatting patterns 1 and 2. Both patterns 1 are centered on the axis x of the track element, whereas the patterns 2 are equally offset therefrom in opposite directions.

The axes y and x define the surface of the data medium, and the axis x defines the normal direction along which incident light radiation is focused by a projector lens 5. The track element is scanned by the light spot 4 when the data medium moves relative to the projector lens in a positive direction along the axis x. Tracking is provided by a return mirror 6 which is pivoted about an axis parallel to the axis x under the control of a motor 7. The data medium is illuminated by a laser source 12 which, for example, emits collimated radiation having rectilinear polarization in direction 20. This radiation passes through a polarization separator tube constituted by two rectangular isosceles prisms 9 and 10 which are stuck together along their large faces 11, after said faces have received an optical treatment to enable them to pass radiation whose polarization lies in the plane of incidence, and to reflect radiation whose polarization 23 is perpendicular to the plane of incidence. A quarter-wave plate 8 converts the rectilinear polarization 20 into circular polarization 21. After being reflected on the data medium and returned via the projector lens 5 and the mirror 6, the light comes back towards the quarter wavelength plate, 8 having circular polarization 22 which is of opposite sign since the light is propagating in the opposite direction. On leaving the quarter-wave plate 8 the polarization of the radiation is such that it is reflected at 45° by the treated face 11. A collector lens 16 collects this radiation of polarization 23 and applies it to a photo-electric assembly 17 which delivers an electrical signal representative of the optical interaction between the light spot 4 and the pre-formatted or subsequently recorded patterns along a scanned track element. An electrical processing circuit 18 receives the electrical signal from the photo-detector assembly 17. It contains a clock together with synchronizing means and serves to define time periods which coincide with scanning areas a, b, and c. Synchronization is based on the scanning of formatting patterns of the type 1 which are recognized by a suitable identification circuit.

The formatting patterns of the type 2 are sampled to evaluate the offset of the light spot 4 from the axis of the track element, and this causes a control signal to be applied to the motor 7 in order to compensate for such offset or tracking errors. The type 2 patterns, or other zones of the data medium, may be used to determine errors in focusing of the radiation, and such errors are compensated by a servo-control loop acting on the distance between the projector lens 5 and the medium. The processor circuit 18 has an output 19 which provides an electrical signal corresponding to the data read from the areas 3. All of these features are abundantly described in the state of the art.

FIG. 1 also shows a graph of the incident light intensity I at various scan points along the data medium. Stage DC corresponds to reading a data area 3. Stage CB corresponds to scanning an intermediate area including pre-formatting patterns 1 and 2. During this stage and the preceding stage, the diagram shows that the light intensity is maintained at a low level $I_1$ which is high enough to enable the medium to be read, but which is below the threshold at which modifications are made to the optical characteristics of the data medium. Stage BA is taken to be a stage during which data 14 is written to the track. It can be seen from the FIG. 1 diagram that the light intensity rises to a higher level $I_2$ in order to mark "1" bits contained in the data onto the data medium. This level $I_2$ is some way above the above-mentioned threshold for altering the optical characteristics of the medium. The light intensity is raised to the write level by means of a control circuit 13 which modulates the laser source 12.

A connection is provided between the circuit 18 and the circuit 13 in order to apply a signal to the input 15 of the circuit 13 which prevents the light intensity from passing to high level $I_2$ while scanning the intermediate or formatting areas b and c. This ensures that the formatting patterns are not accidentally overwritten by data.

In the three stages illustrated in FIG. 1, the light intensity does not vary on the surface of the data medium during stages DC and CB, where the incident energy is maintained at a constant level $I_1$.

Although use of an optical memory does indeed include periods of time during which recorded data is reproduced, these periods of time are generally separated by relatively long standby periods during which the sole essential activity of the optical memory is to continue reading the formatting patterns.

In this case, it is pointless to scan the data areas 3 with the same illumination mode as when scanning the formatting patterns. The light energy may thus be reduced while the data areas are being scanned, particularly since it remains to be demonstrated that high doses of light energy are completely inoccuous thereto. Such a reduction in energy is particularly desirable when using reversible optical memories since it is important not to "wear out" the recorded, but erasable, data.

Figure 2:
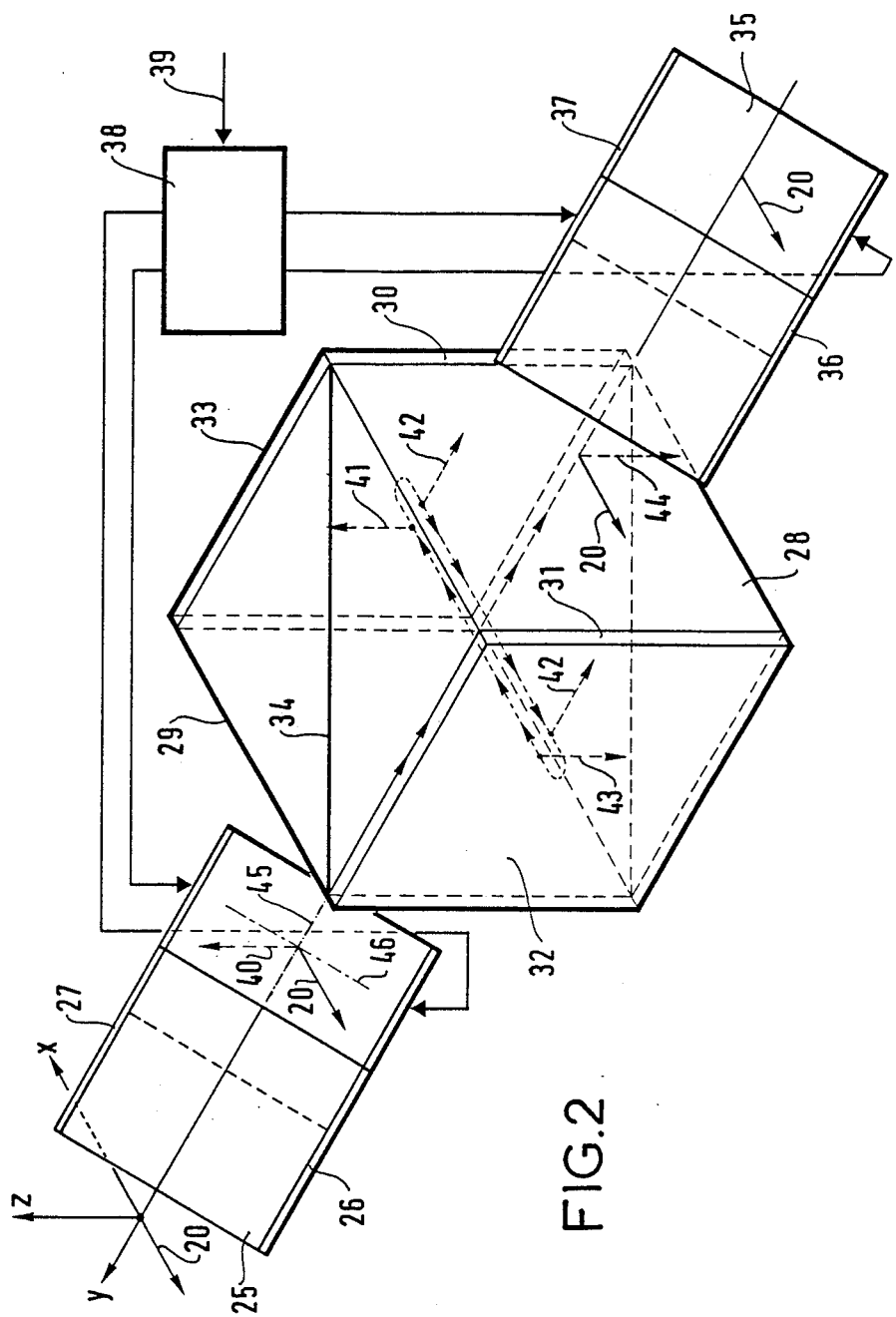
FIG. 2 is an isometric view of an electro-optical device suitable for modifying the illumination mode of a data medium.

FIG. 2 is an isometric diagram given by way of non-limiting example of an electro-optical device suitable for modifying the illumination mode of the data medium.

This device is intended to be placed between the laser source 12 and the separator cube 9–10 as shown in FIG. 1.

It comprises two electro-optical cells constituted by blocks 25 and 35 of electrically birefringent material such as lithium niobate. The block 25 is provided with electrodes 26 and 27 in order to set up an inducing electrical field therein in response to an electrical control voltage applied by a circuit 38. The electrical field extends along a direction parallel to one of the bisectors of the angle xOz. The block 35 is fitted with electrodes 37 and 36 in order to produce the same modulating effects as the assembly 25, 26, 27 in response to an electrical control voltage which may be the same as that applied to the electrodes 26 and 27.

The electrical birefringence of the two electro-optical cells is such that optical radiation passing through either of the blocks or 35 in the z direction is subjected to a change in direction of polarization equal to that produced by passing through a halfwave plate having neutral lines 45 and 46 oriented at 45° to the direction of polarization of the incident radiation.

FIG. 2 shows a polarization separator cube comprising two rectangular isosceles prisms 28 and 29 stuck together by their large faces 34, which faces have been treated so that they transmit radiation polarized in the plane of incidence and so that they reflect radiation polarized in the perpendicular direction thereto. The faces of the prism which are parallel to the direction z along which the radiation is transmitted are provided with quarterwave plates 30 and 31 whose free faces 32 and 33 are to be considered, for the time being, as being made to be reflective.

The entire separator cube as described above is disposed between the two electro-optical cells, and given the above description, radiation having polarization in direction 20 passes straight through the entire structure shown in FIG. 2 so long as no electrical voltage is applied to the electrodes 26 & 27 or 36 & 37.

However, the light path is modified when the voltage delivered by the circuit 38 switches the polarization direction at the outlet from the first cell 25, 26, 27. The incident radiation on the facette 34 has a polarization direction 40 which is at right angles to the polarization direction 20. It is thus reflected towards the quarterwave plate 30 with a polarization direction 41, and after passing both ways through the quarterwave plate it returns with a polarization direction 42 enabling it to pass through the facette 34. The radiation then encounters the quarterwave plate 31 with a polarization direction 42, and after passing both ways through the quarterwave plate 31 it returns to the facette 34 with a polarization direction 43 which ensures that it is reflected towards the second cell 35, 36, and 37. The role of the second cell is to switch the polarization direction 44 back to the initial direction 20.

The FIG. 2 optical system can thus be used to select between a direct path and a folded path.

If the outer plane faces 32 and 33 of the quarterwave plates are used as plane reflectors, and if the facette 34 is plane, both of these paths are equivalent so far as the shape and the orientation of the wavefronts leaving the structure are concerned.

However, the reflective powers of said faces may cause the paths to be different from each other in intensity, thereby providing the possibility of using the above assembly for varying the illumination mode on the data medium; however, this possibility can be obtained more simply by acting on the light source, in particular since it is intended for high-speed intensity modulation.

Apart from the above possibility of being used to modulate intensity, the optical arrangement shown in FIG. 2 is additionally of interest in that it can be used to influence the distribution of illumination by modifying the shape or the orientation of the wavefront with an extremely short reaction time. This opens up new ways of using the optical memory.

Figure 3:
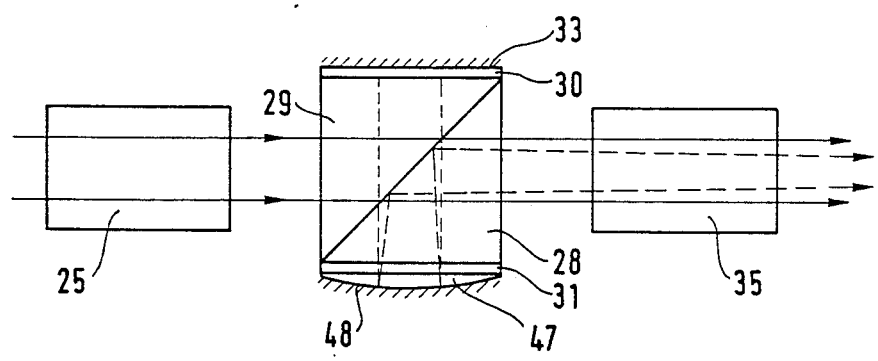
FIGS. 3, 4, and 5 are explanatory diagrams.

As shown in FIG. 3, the reflection conditions adjacent to the quarterwave plate 31 may be modified by sticking a plano-convex lens 47 thereto having a face 48 which is curved in at least one direction. This face 48 is made to be reflective. A collimated beam passing through the structure without encountering the faces 33 and 48 is shown in solid lines in FIG. 3. This is what happens when no control voltage is applied to the terminals of the cells 25 and 35. When a a control voltage is applied, the resulting light beam is modified, as shown by the dashed lines. If the surface 48 is spherical, the emerging beam has modified vergency thereby defocussing the beam projected onto the data medium by the projector lens 5.

Figure 5:
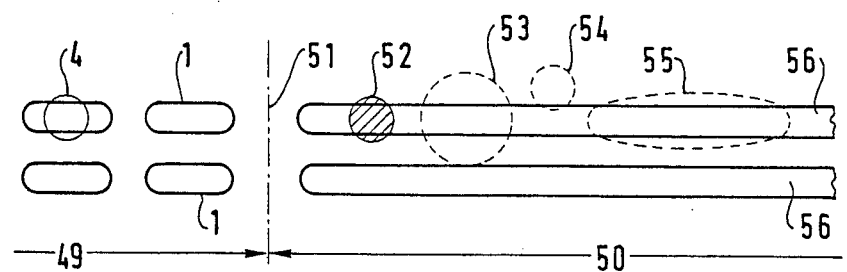

This change is illustrated in FIG. 5 which is a plan view of a fragment of the data medium and which shows its illumination.

Two adjacent track elements are shown, with an intermediate area 49 to the left of a line 51 having formatting patterns of the type 1 and with a data region 50 to the right of the line 51. In accordance with the invention, the spot 4 is shown as being circular and properly focused in the formatting area 49 thereby ensuring sufficient intensity to enable the formatting patterns to be analyzed. However, in the data area 50 the mode of illumination may be modified, supposing that neither a read operation nor a write operation is to take place.

Reference 52 designates illumination by a spot whose intensity has been considerably reduced but whose extent is unaltered.

Reference 53 designates illumination by a spot of increased size; this effect is obtained using a switch device as shown in FIG. 2, in which the reflective surface 48, as shown in FIG. 3, is spherical.

Reference 55 indicates an elongate or oblong spot which may also be provided using a FIG. 2 type switch, but in this case the reflective surface 48 is curved in one direction only, e.g. it is constituted by a cylindrical mirror. This variant introduces astigmatism which may be useful, in particular, when erasing recorded data.

The invention is not limited to the examples described. The important features are that the mode of illumination changes rapidly when the separator line 51 is crossed, and also each time a writing or reading instruction is to be performed after a period of standby operation.

Figure 4:
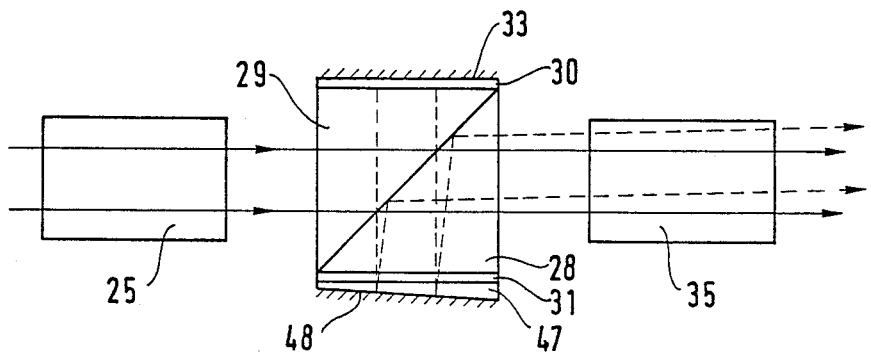

FIG. 4 shows a variant on the FIG. 3 arrangement on which the lens 47 is replaced by a prism 47. This variant does not affect the vergency of the beam, but it deflects it slightly so that the spot scans the gap between adjacent tracks, as illustrated by reference 54 in FIG. 5.

Figure 6:
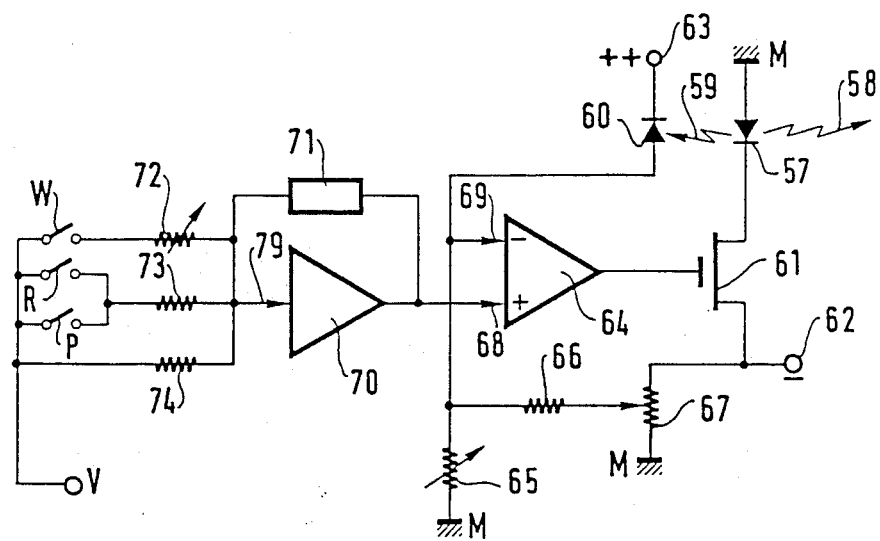
FIGS. 6 and 7 are electrical circuit diagrams showing how an optical memory in accordance with the invention is controlled.

FIG. 6 is a diagram of a circuit suitable for changing the mode of illumination of a data medium in accordance with the present invention.

In order to avoid excessively complicating the diagram, instructions for writing, reading, and periodically reading the formatting patterns are represented as being applied by respective switches W, R, and P.

Closing the switch W corresponds to an external write request. Closing the switch R corresponds to an external data read request. The switch P is periodically closed under the control of the circuit 18 which generates a signal accurately marking the periods when the formatting patterns are being scanned.

The radiation 58 which illuminates the data medium is produced by a laser module which includes a laser diode 57 and a photodiode 60 which receives a fraction 59 of the emitted radiation. The laser diode 57 is connected in series with a field effect transistor 61 between ground M and a terminal 62 connected to a source of negative voltage. The photodiode 60 connects a terminal 63 of a source of positive voltage to an inverting input 69 of an operational amplifier 64 whose output is connected to the gate electrode of transistor 61.

A potentiometer 67 delivers a fraction of the negative feed voltage to a fixed resistor 66 which is connected to the inverting input 69 and also to ground M via an adjustable resistance 65. The non-inverting input 68 of the amplifier 64 receives a voltage at one of three different levels representative of different values of optical radiation power 58. For example, these levels may be 0.125 mW; 1.25 mW; and 10 mW. The control voltage is supplied by an operational amplifier 70 whose input 79 receives feedback from its output via an impedance 71. The control voltage depends on the signals applied to the input 79 via three resistors 72, 73, and 74.

The resistor 74 is directly connected to a voltage source V and fixes the lowest level of radiation from the laser diode 57. Advantageously this level is not zero, since it is useful to maintain the optical feedback via the photodiode 60 without interruption, since it would otherwise be necessary to pass through possibly inconvenient transient conditions each time the laser diode returns to normal operation.

When the switch W is closed, the voltage V is applied to the resistor 72 which is adjusted so that the resulting light emission 58 causes data to be written with the desired level of intensity. So long as the components R, P, and 73 are ignored, the circuit as described above is a conventional control circuit suitable for modulating light intensity as shown by the waveform diagram in FIG. 1. In a variant embodiment of the invention, periodically closing the switch P causes the potential V to be applied to the resistor 73, thereby adjusting the intensity of the emitted light 58 to a read level lying between the standby level as set by the resistor 74, and the write level as set by the resistor 72. This ensures that sufficient light power is applied to enable the formatting patterns to be read.

The switch R is connected in parallel with the switch P and also serves to ensure that sufficient read power is applied when actually reading data, thereby allowing the data areas to be read selectively independently from the periodic interrogation of the formatting areas.

Figure 7:
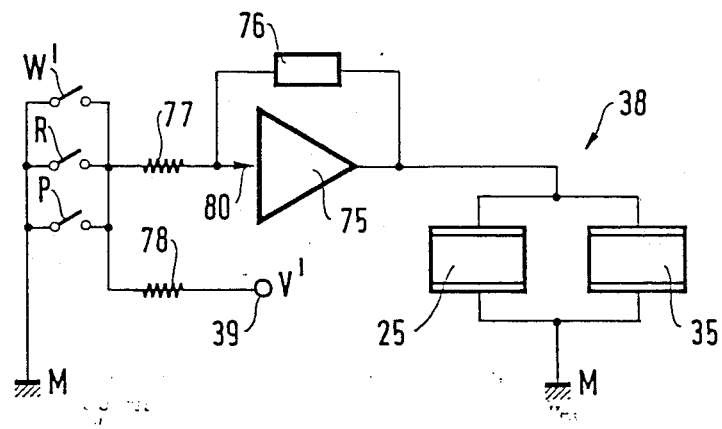

Another variant embodiment is shown in FIG. 7 which shows a circuit for controlling the beam-shaping means shown in FIGS. 2 to 4. When this circuit is used, the switches R and P and the resistor 73 shown in FIG. 6 become optional since it is not essential to modulate the intensity of the laser beam at the same time.

The electro-optical cells 25 and 35 are controlled by an operational amplifier 75 capable of providing an output voltage with a very short rise time. The input 80 to the amplifier is looped to its output via an impedance 76. A resistor 77 is connected in series between the input 80 and a resistor 78 which is connected to a voltage source 39 for supplying a voltage V' relative to ground M. The common point between the resistors 77 and 78 is connectable to ground M. The common point between the resistors 77 and 78 is connectable to ground via three switches W', R and P, which are connected in parallel. If any one of these switches is closed, the electro-optical cells 25 and 35 have no voltage applied thereto, thereby ensuring that a very small spot of properly centered light is applied to the track element being scanned.

If none of the switches W', R or P is closed, the electro-optical cells switch the polarization of the light so that the medium is illuminated in one of the ways 52, 53, 54, or 55 shown in FIG. 5.

The switches R and P connected to ground M are of the same kind as the switches R and P connected to the voltage V in FIG. 6. However, the switch W' differs from the switch W in that it may be kept closed throughout a data write cycle. It is also important to remember that the switch W must be open each time a formatting area is scanned (except for the possible special case of the occasion on which the formatting patterns are themselves initially written on the medium) and that the switch W is only closed when writing "1" bits in the data areas.

A useful application of a beam control system enabling the convergence characteristics of the beam to be changed and also enabling its intensity to be moderated lies in the use of optical data media on which data can be erased by means of a reversible transcription process. Media exist having a magnetic layer in which the direction of magnetization of a domain can be used to represent a binary 0 or 1. Writing is performed by means of an optical head fitted with an inductor winding which selects the magnetization direction in a domain as defined by the transient heating which results from the impact of a suitable light beam. Domains are read by means of the Faraday effect which consists in careful analysis of the rotation of the polarization direction of the light that has interacted with the data medium. Data may be erased by a process similar to writing, except insofar as the sign of the magnetic field is reversed in order to return the magnetization to its initial direction where appropriate by extending the optically addressed area.

For example, in order to erase the medium, the switch W may be closed while the switch W' is open, thereby defocusing the spot while scanning the data areas to be erased. The contour of the defocused spot may be as shown at 53 or 55 in FIG. 5.

This mode of operation is also applicable to reversible layers based on thermo-optical interaction which causes a phase change between an amorphous state and a crystalline state. Phase change kinetics require that heating should continue for a relatively long time when data is to be erased, and this can require the spot to be elongated in the scanning direction along a track element. In this case, account may need to be taken of spot elongation by leaving a safety margin at the beginning and the end of each data area.

The invention is not limited to creating lighting conditions suitable for standby operation. It also extends to creating lighting conditions suitable for erasing previously recorded data. The lighting or illumination conditions may be modified by using the above-described electro-optical means, or else it may be provided by using an acousto-optical modulation cell or by switching between the radiation produced by two electrically modulatable light sources having an optical superposition device between said sources and transmitting the final radiation along a common optical axis.

What is claimed is:

1. An optical memory system with sampled tracking for a pre-formatted medium, said medium comprising pre-recorded areas including a plurality of pre-formatted tracking patterns defining a location of track elements and address information, and reserved areas, alternating with said prerecorded areas to store user data, said system comprising:

means for producing a variable level optical beam for scanning said track elements;

means for modulating a level of said variable level optical beam;

means for controlling said modulating means to adjust a level of said optical beam such that:

in a reading mode in which data in the reserved areas are to be read, the pre-recorded areas and the reserved areas are scanned by a beam at a first level which is high enough to enable the reading, in a writing mode in which data in the reserved areas are to be written, the reserved areas are scanned by a beam at a level which is higher than the first level and the pre-recorded areas are scanned by a beam at the first level, said higher level and first level beam controlled by controlling said modulating means to modulate said variable level optical beam producing means, and in a standby mode in which data in the reserved areas are neither to be written nor read but predetermined tracking patterns are followed, the reserved areas are scanned by a beam at a substantially reduced level lower than the first level which is formed by means for producing a variable level optical beam and the pre-recorded areas are scanned by a beam at the first level; and sampling means for ensuring that focusing and track following are effected solely by those portions of the photodetected signal which correspond to the contents of the pre-recorded areas.

2. A system according to claim 1, further comprising means for selecting only one of (a) said reading mode or (b) one of said other modes at any time.

3. A system according to claim 1, further comprising means for causing modes other than said reading mode to differ from said reading mode by using a different distribution of optical energy incident on the surface of said medium, said means for causing comprising a projector lens for projecting illumination and means for modifying wavefronts of said optical waves received by said projector means.

4. A system according to claim 3, wherein said projector lens comprises means for projecting a light spot whose contour is expanded in at least one direction of said surface, relative to a circular contour of a light spot as projected by the common illumination mode.

5. A system according to claim 4, wherein said projecting means produces said expanded contour of a circular shape.

6. A system according to claim 4, wherein said means for expanding the contour comprises means for modifying an astigmatism in said spot such that a long axis thereof points along the scanning direction of said track elements.

7. A system according to claim 3, wherein the means for modifying said reading mode comprises means for offsetting the spot projected by said projector lens away from the track element being scanned.

8. A system according to claim 1, wherein said means for producing an optical beam comprises a light source and a projector lens having an electrically-controlled electro-optical device disposed therebetween said electro-optical device comprising two electro-optical cells and a polarization separator situated between said two electro-optical cells.

9. A system according to claim 8, further comprising two quarter wavelength plates, between which said polarization separator is situated, with outer faces that are provided with reflecting means which receive the polarized radiation coming from said source only when its rectilinear polarization bas been rotated through 90° by one of said cells.

10. A system according to claim 9, wherein at least one of said reflector means comprises means for modifying the refractive power of the incident beam in at least one direction.

11. A system according to claim 1, wherein said information-supporting medium is of a type rewritable several times over.

12. A system according to claim 1, wherein said information-supporting medium is of a type capable of having data written thereto once only.

13. A system according to claim 1, wherein said information-supporting medium is a disk having a thermo-writable structure on at least one of its faces.

* * * * *